(12) United States Patent
Kim et al.

(10) Patent No.: US 11,549,630 B2
(45) Date of Patent: Jan. 10, 2023

(54) CONNECTOR FOR SETTING LAYOUT OF BRAKE HOSE

(71) Applicant: HS R & A Co., Ltd., Gyeongsangnam-do (KR)

(72) Inventors: Byeong Ju Kim, Busan (KR); Jae Hyeok Choi, Gyeongsangnam-do (KR); Guk Hyun Kim, Gyeongsangnam-do (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 17/143,749

(22) Filed: Jan. 7, 2021

(65) Prior Publication Data

US 2021/0213926 A1 Jul. 15, 2021
US 2022/0161775 A9 May 26, 2022

(30) Foreign Application Priority Data

Jan. 13, 2020 (KR) .................. 10-2020-0004390

(51) Int. Cl.
*F16M 11/00* (2006.01)
*F16L 55/00* (2006.01)
(Continued)

(52) U.S. Cl.
CPC ............ *F16L 55/00* (2013.01); *B60T 17/043* (2013.01); *B60T 17/046* (2013.01); *G01B 5/14* (2013.01)

(58) Field of Classification Search
CPC .......................... B60T 17/043; B60T 17/046
See application file for complete search history.

(56) References Cited

U.S. PATENT DOCUMENTS 3,486,773 A 12/1969 Deplante
10,427,666 B1 10/2019 Van Haecke
(Continued)

FOREIGN PATENT DOCUMENTS

EP 3 540 402 A1 9/2019
GB 1020699 A 2/1966
(Continued)

OTHER PUBLICATIONS

Extended European Search Report (eight pages) dated Apr. 21, 2021 from corresponding European Application No. 20 21 7752.3.
(Continued)

*Primary Examiner* — Amy J. Sterling
(74) *Attorney, Agent, or Firm* — Crowell & Moring LLP; John C. Freeman (57) ABSTRACT

In embodiments, a connector for setting a layout of a brake hose includes a first coupling member coupled to one end of the brake hose; a second coupling member disposed to be spaced apart from the first coupling member, and coupled to the caliper housing or the frame of the master cylinder; and an adjusting unit connected at one end thereof to the first coupling member, connected at other end thereof to the second coupling member, and configured to adjust a shortest length between a bottom surface of the first coupling member and an outer circumferential surface of the second coupling member and to adjust a bend angle between the first coupling member and the second coupling member, in a test for setting the layout of the brake hose.

5 Claims, 10 Drawing Sheets

(51) Int. Cl.
*G01B 5/14* (2006.01)
*B60T 17/04* (2006.01)

(56) References Cited

U.S. PATENT DOCUMENTS

| | | | | |
|---|---|---|---|---|
| 2005/0236888 | A1* | 10/2005 | Corbin | B60T 17/043 303/7 |
| 2009/0095367 | A1* | 4/2009 | Socha | B60T 17/043 138/34 |
| 2013/0047454 | A1 | 2/2013 | Long et al. | |
| 2015/0001842 | A1* | 1/2015 | Jones | F16L 27/047 285/261 |
| 2017/0305401 | A1* | 10/2017 | Takenaka | F16D 65/0068 |
| 2019/0263372 | A1* | 8/2019 | Normyle | B60T 15/041 |
| 2019/0277728 | A1 | 9/2019 | Kim et al. | |
| 2020/0001848 | A1* | 1/2020 | Gaggero | F16D 51/30 |

FOREIGN PATENT DOCUMENTS

| | | |
|---|---|---|
| KR | 20-0318560 Y1 | 6/2003 |
| KR | 20-2010-0011421 U | 11/2010 |
| KR | 10-1273101 B1 | 6/2013 |
| KR | 10-2015-0098695 A | 8/2015 |
| KR | 10-2017-013 6744 A | 12/2017 |

OTHER PUBLICATIONS

Office Action dated Jan. 18, 2021 from corresponding Korean Patent Application No. 10-2020-0004391 (14 pages including English translation).

* cited by examiner

FIG. 10

CONNECTOR FOR SETTING LAYOUT OF BRAKE HOSE

CROSS-REFERENCE TO RELATED APPLICATION(S)

This application is based on and claims priority under 35 U.S.C. § 119 to Korean Patent Application No. 10-2020-0004390, filed on Jan. 13, 2020, in the Korean Intellectual Property Office, the entire disclosure of which is herein incorporated by reference.

BACKGROUND OF THE INVENTION

Field of the Invention

The disclosure relates to a connector for setting a layout of a brake hose. More particularly, the disclosure relates to a layout setting connector capable of adjusting a layout of a brake hose in a test process of setting the layout of the brake hose.

Description of Related Art

In a vehicle braking system using hydraulic pressure, the hydraulic pressure is generated from a master cylinder responsive to the operation of a brake pedal, and when the hydraulic pressure is applied to a cylinder in a caliper housing through a brake pipe and a brake hose, a brake pad comes into contact with a disk to generate a braking force.

In case of a front axle of the vehicle, a wheel moves up and down depending on road surface conditions and moves left and right in response to steering of a steering wheel. Therefore, the brake hose supplying a brake oil should have flexibility so that it is varied in shape according to the movement of the wheel. For this reason, a rubber hose is mainly used as the brake hose.

The brake hose has to be installed stably without causing interference with other parts around it. Because the vehicle is directly connected to a driver's life, strict management of respective vehicle parts is required, and it is more important especially in the brake system.

Figure 1:
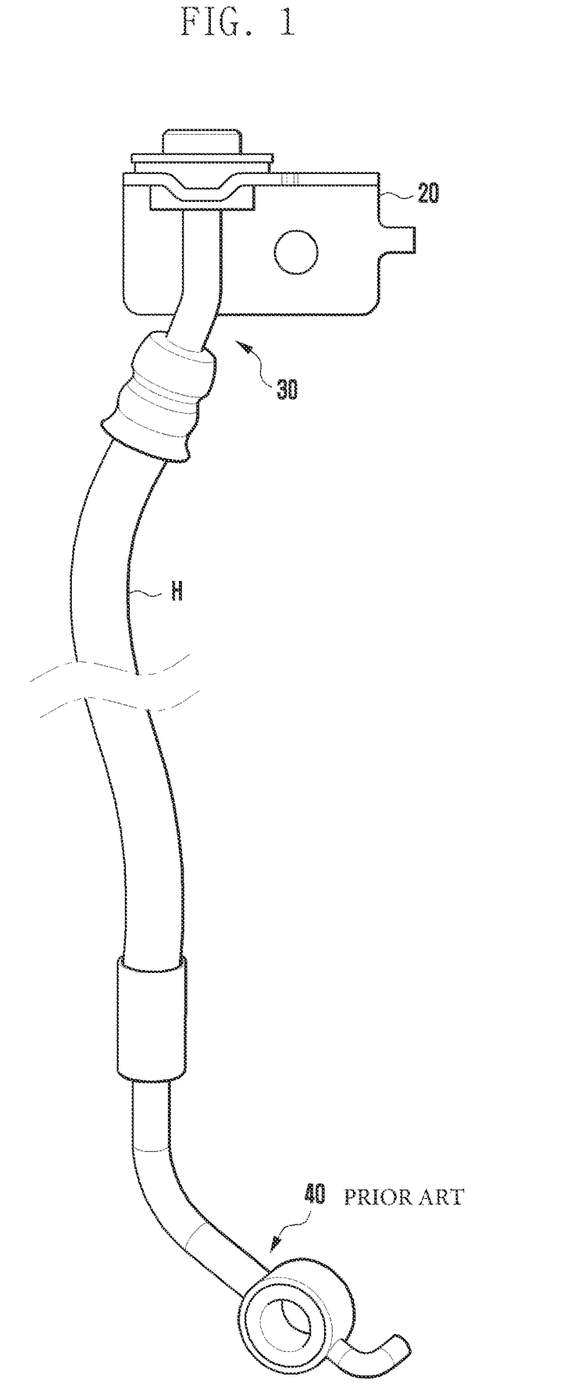
FIG. 1 is a view showing connectors coupled to both ends of a brake hose generally applied to a vehicle in a well-known manner.

FIG. 1 is a view showing connectors coupled to both ends of a brake hose generally applied to a vehicle in a well-known manner.

Referring to FIG. 1, the brake hose H is coupled at both ends to a first connector 30 and a second connector 40. The first connector 30 is connected to a frame (not shown) of a master cylinder through a bracket 20, and the second connector 40 is connected to a caliper housing (not shown) of the vehicle through a benzo bolt. In this way, the brake hose H can be disposed between the caliper housing and the frame.

Each of the connectors 30 and 40 should be configured in a specific shape to avoid interference between the brake hose H and surrounding parts. In particular, each of the connectors 30 and 40 is formed to be bent at a predetermined angle while having a predetermined length avoiding interference between the brake hose H and surrounding parts.

In general, a layout setting test is conducted so that the brake hose H can avoid interference with surrounding parts. A conventional test for setting the layout of the brake hose H is performed by actually installing the brake hose H in the vehicle through the connectors 30 and 40 when the design of the connectors 30 and 40 coupled to both ends of the brake hose H is completed. That is, the test is performed to check whether any interference occurs while driving between the brake hose H and the surrounding parts.

If the brake hose H interferes with the surrounding parts in the test for setting the layout of the brake hose H, the connectors 30 and 40 are removed from the vehicle and their lengths and bend angles are redesigned. Then, the redesigned connectors are mounted again in the vehicle and the test is repeated. Therefore, it takes a lot of time to set the layout of the brake hose H, and also the manufacturing cost is increased unnecessarily.

SUMMARY OF THE INVENTION

The disclosure provides a connector for setting a layout of a brake hose. The setting connector used to set the layout of the brake hose is implemented so that its length and bend angle can be adjusted. Therefore, using the setting connector makes it possible to accurately set the shape of a connector to be actually disposed in a vehicle while being coupled to the brake hose.

According to embodiments of the disclosure, a connector for setting a layout of a brake hose disposed between a caliper housing and a frame of a master cylinder in a vehicle may include a first coupling member coupled to one end of the brake hose; a second coupling member disposed to be spaced apart from the first coupling member, and coupled to the caliper housing or the frame of the master cylinder; and an adjusting unit connected at one end thereof to the first coupling member, connected at other end thereof to the second coupling member, and configured to adjust a shortest length between a bottom surface of the first coupling member and an outer circumferential surface of the second coupling member and to adjust a bend angle between the first coupling member and the second coupling member, in a test for setting the layout of the brake hose. In particular, the adjusting unit may include a length adjuster including a first length adjusting bar connected at one end thereof to the second coupling member, and a first tube body slidably coupled to other end of the first length adjusting bar; and an angle adjuster including a ball joint rotatably coupled to the first tube body, and a second tube body coupled at one end thereof to the ball joint and connected at other end thereof to the first coupling member.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Now, various embodiments of the disclosure will be described in detail with reference to the accompanying drawings. In the following description of embodiments, descriptions of techniques that are well known in the art and not directly related to the disclosure are omitted. This is to clearly convey the subject matter of the disclosure by omitting any unnecessary explanation. For the same reason, some elements in the drawings are exaggerated, omitted, or schematically illustrated. Also, the size of each element does not entirely reflect the actual size. In the drawings, the same or corresponding elements are denoted by the same reference numerals.

Hereinafter, a connector for setting a layout of a brake hose according to various embodiments of the disclosure will be described with reference to FIGS. 2 to 10.

Figure 2:
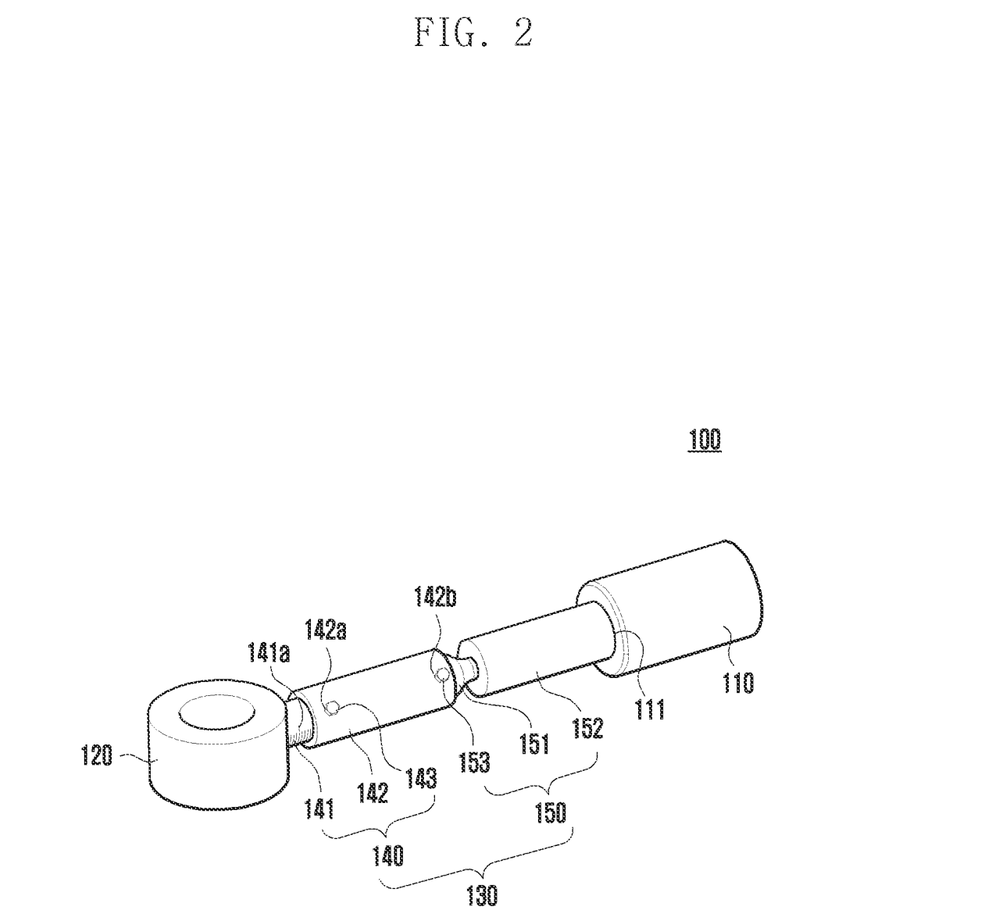
FIG. 2 is a perspective view showing a structure of a connector for setting according to a first embodiment of the disclosure.
Figure 3:
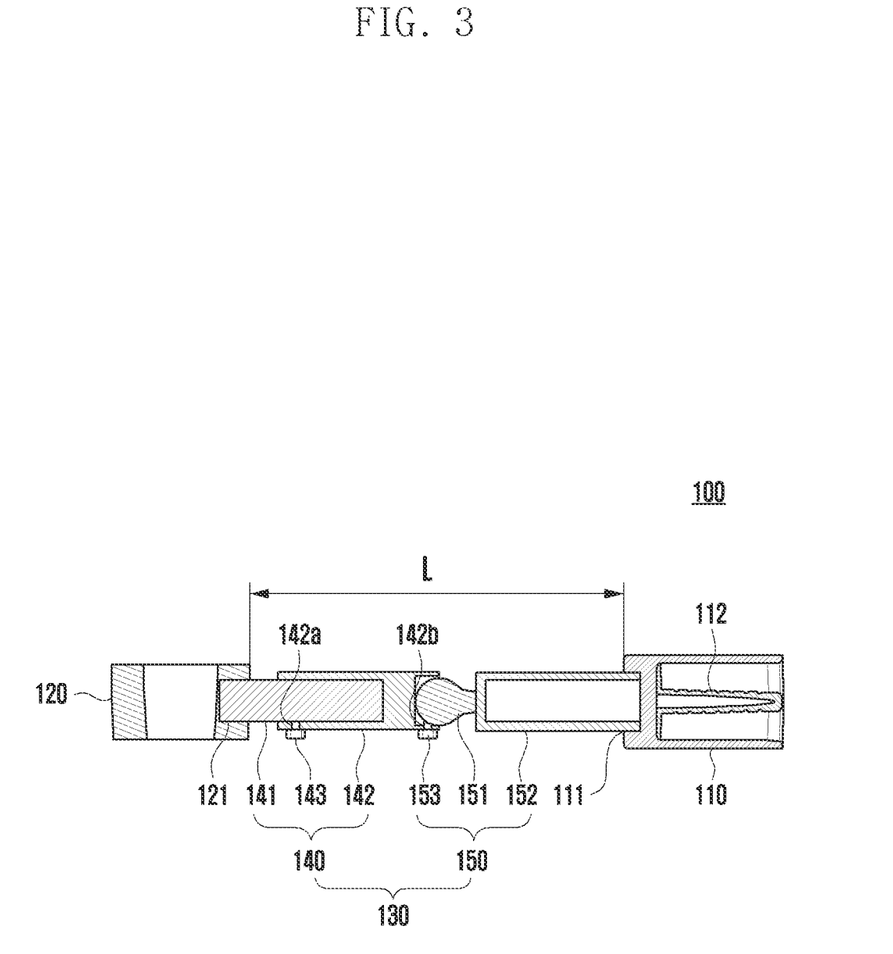
FIG. 3 is a cross-sectional view showing the structure of the setting connector according to the first embodiment of the disclosure.
Figure 4:
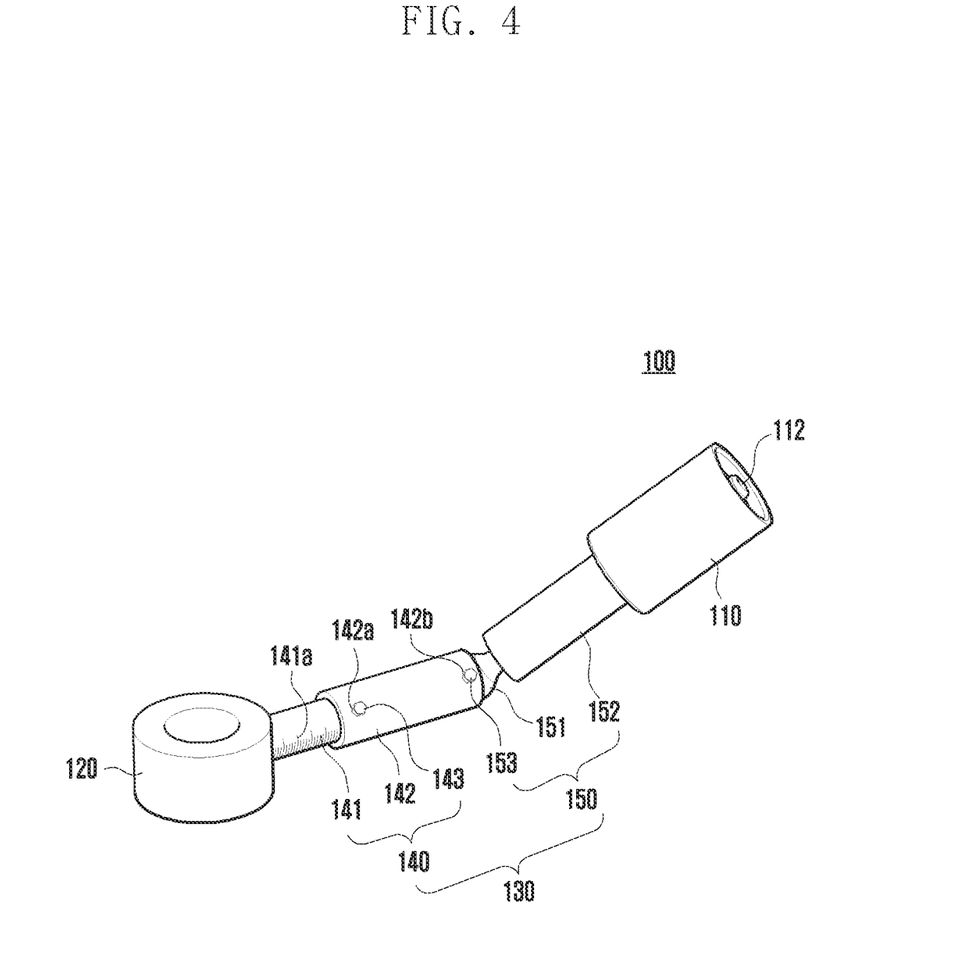
FIG. 4 is a perspective view showing an operating state of the setting connector according to the first embodiment of the disclosure.

FIG. 2 is a perspective view showing a structure of a connector for setting according to a first embodiment of the disclosure, and FIG. 3 is a cross-sectional view showing the structure of the setting connector according to the first embodiment of the disclosure. FIG. 4 is a perspective view showing an operating state of the setting connector according to the first embodiment of the disclosure.

Referring to FIGS. 2 to 4, a setting connector 100 according to the first embodiment of the disclosure is used for setting the layout of a brake hose, especially, for accurately setting the shape of a real connector that connects one end of a brake hose (H, see FIG. 1) to one end of a caliper housing (10, see FIG. 9) or to a frame (not shown) of a master cylinder. The setting connector 100 may include a first coupling member 110, a second coupling member 120, and an adjusting unit 130.

The first coupling member 110 may be formed in a tubular shape and may have therein a coupling pin 112 coupled to one end of the brake hose H.

The one end of the brake hose H may be fitted inside the first coupling member 110, and the coupling pin 112 may be fitted inside the brake hose H.

In this state, when a clamping process is performed to compress the one end of the brake hose H and the first coupling member 110, the brake hose H and the first coupling member 110 may be coupled to each other. However, compression by the clamping process is exemplary only, and the coupling between the brake hose H and the first coupling member 110 is not limited thereto.

The second coupling member 120 connects the brake hose H, coupled to the first coupling member 110, to the caliper housing 10. The second coupling member 120 may be fixed to the caliper housing 10 by a separate fastening member (B, see FIG. 9).

The adjusting unit 130 may be disposed such that one end is connected to the first coupling member 110 and the other end is connected to the second coupling member 120.

In a test for setting the layout of the brake hose H, the adjusting unit 130 may adjust a length (L) between the first coupling member 110 and the second coupling member 120, for example, the shortest length (L) between the bottom surface of the first coupling member 110 and the outer circumferential surface of the second coupling member 120. In addition, the adjusting unit 130 may adjust a bend angle (D) between the first coupling member 110 and the second coupling member 120. The adjusting unit 130 may include a length adjuster 140 and an angle adjuster 150.

The length adjuster 140 may include a first length adjusting bar 141 connected at one end thereof to the second coupling member 120, and a first tube body 142 slidably coupled to the other end of the first length adjusting bar 141.

Coupling between the first length adjusting bar 141 and the first tube body 142 may be made by a coupling force that allows the first tube body 142 to slide with respect to the first length adjusting bar 141 by an operator's manipulating force in a state where the first tube body 142 is fixed to the caliper housing 10. On the other hand, in the test for setting the layout of the brake hose H, a coupling state between the first length adjusting bar 141 and the first tube body 142 may be maintained through a first fixing member 143 to be described later.

One end of the first length adjusting bar 141 may be rotatably connected to the second coupling member 120. Thus, a first coupling recess 121 may be formed in the second coupling member 120 to rotatably accommodate the one end of the first length adjusting bar 141.

An operating example of the length adjuster 140 is shown in FIG. 4. In a state where the second coupling member 120 is coupled to the caliper housing 10, the first tube body 142 may slidingly move with respect to the first length adjusting bar 141 so as to adjust the overall length of the first length adjusting bar 141 and the first tube body 142. This allows adjusting the shortest length (L) between the bottom surface of the first coupling member 110 and the outer circumferential surface of the second coupling member 120.

In order to fix the adjusted overall length of the first length adjusting bar 141 and the first tube body 142 in the test for setting the layout of the brake hose H, the length adjuster 140 may further include a first fixing member 143 that passes through a surface of the first tube body 142 and fastens the first length adjusting bar 141 residing inside the first tube body 142. In this case, a first fastening hole 142a into which the first fixing member 143 is inserted may be formed in the surface of the first tube body 142.

Therefore, the overall length of the first length adjusting bar 141 and the first tube body 142 can be fixed, after adjusted, by the first fixing member 143 in the test for setting the layout of the brake hose H, so that it is possible to accurately set the length of a connector to be actually applied.

The angle adjuster 150 may include a ball joint 151 rotatably coupled to the other end of the first tube body 142, and a second tube body 152 coupled at one end to the ball joint 151 and connected at the other end to the first coupling member 110.

Coupling between the ball joint 151 and the first tube body 142 may be made by a coupling force that allows the ball joint 152 to rotate by an operator's manipulating force.

One end of the second tube body 152 may be rotatably connected to the first coupling member 110. Thus, a second coupling recess 111 may be formed in the first coupling member 110 to rotatably accommodate the one end of the second tube body 152.

An operating example of the angle adjuster 150 is as follows. In a state where the second coupling member 120 is coupled to the caliper housing 10, the ball joint 151 may rotate through the second tube body 152 with respect to the first tube body 142 so as to adjust an angle between the first tube body 142 and the second tube body 152. This allows adjusting the bend angle (D) between the first coupling member 110 and the second coupling member 120.

In order to fix the adjusted angle between the first tube body 142 and the second tube body 152 in the test for setting the layout of the brake hose H, the angle adjuster 150 may further include a second fixing member 153 that passes through a surface of the first tube body 142 and fastens the ball joint 151 residing inside the first tube body 142. In this case, a second fastening hole 142b into which the second fixing member 153 is inserted may be formed in the surface of the first tube body 142.

Therefore, the angle between the first tube body 142 and the second tube body 152 can be fixed, after adjusted, by the second fixing member 153 in the test for setting the layout of the brake hose H, so that it is possible to accurately set the bend angle of a connector to be actually applied.

The length adjuster 140 may further include a first scale indication 141a formed on the outer circumferential surface of the first length adjusting bar 141 in a longitudinal direction of the first length adjusting bar 141. The first scale indication 141a allows identifying a moving distance of the first tube body 142 with respect to the first length adjusting bar 141.

That is, the first scale indication 141a clearly indicates the moving distance of the first tube body 142 with respect to the first length adjusting bar 141, so that the operator can easily identify how long the shortest length between the bottom surface of the first coupling member 110 and the outer circumferential surface of the second coupling member 120 is adjusted by the length adjuster 140.

As described above, the layout setting connector 100 for the brake hose H according to the first embodiment of the disclosure is capable of adjusting the overall length of the first length adjusting bar 141 and the first tube body 142 and also adjusting the bend angle between the first tube body 142 and the second tube body 152. Consequently, the setting connector 100 is capable of adjusting the shortest length and the bend angle between the first coupling member 110 and the second coupling member 120.

Therefore, while repeatedly adjusting the length L and bend angle D of the setting connector 100 in the test for setting the layout of the brake hose H, it is possible to find the shape of a real connector that prevents interference between the brake hose H and surrounding parts. That is, by adjusting the length L and bend angle D of the setting connector 100, it is possible to accurately set the shape of the connector actually installed in the vehicle.

Hereinafter, a connector for setting a layout of a brake hose according to a second embodiment of the disclosure will be described with reference to FIGS. 5 to 8.

Figure 5:
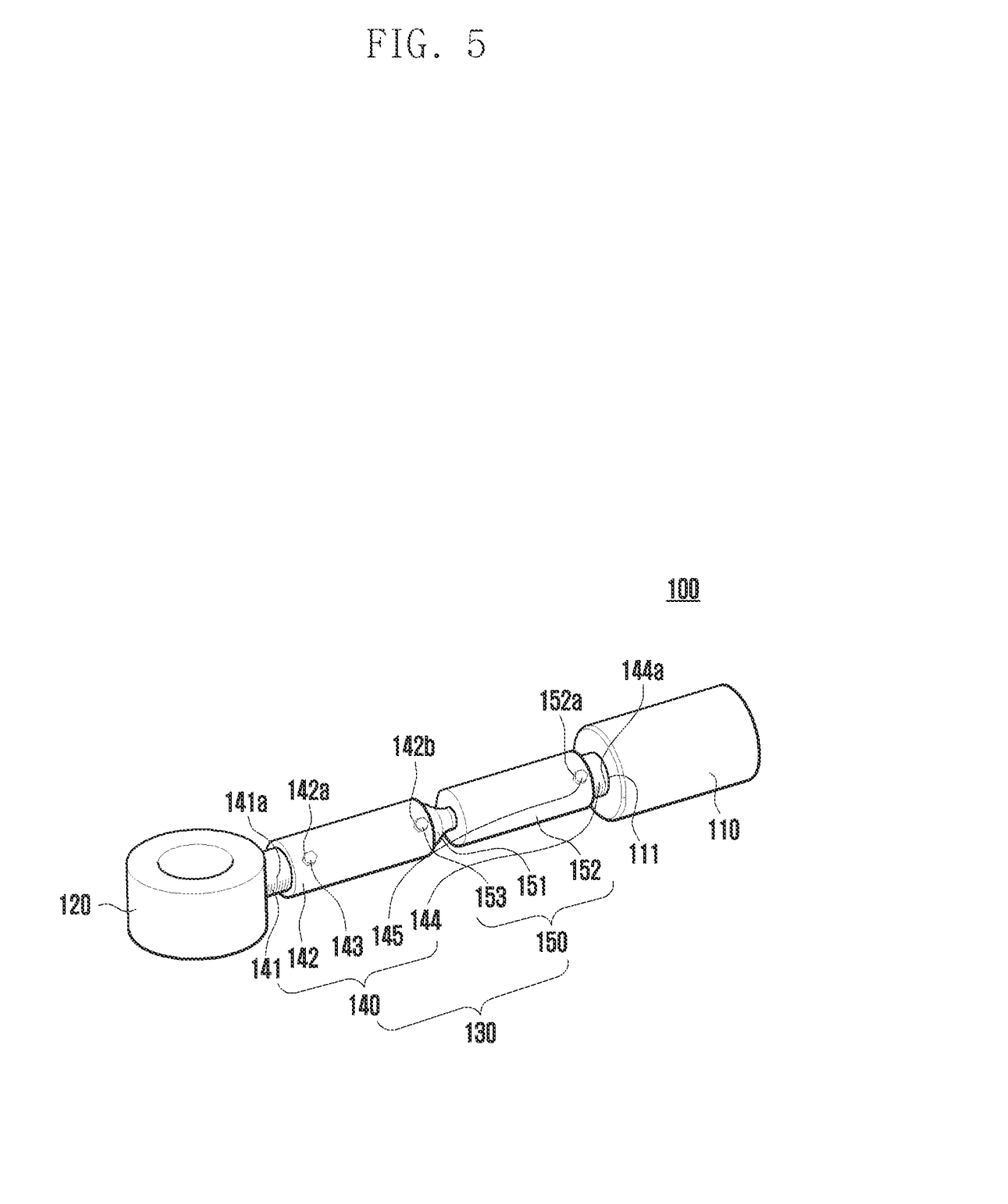
FIG. 5 is a perspective view showing a structure of a connector for setting according to a second embodiment of the disclosure.
Figure 6:
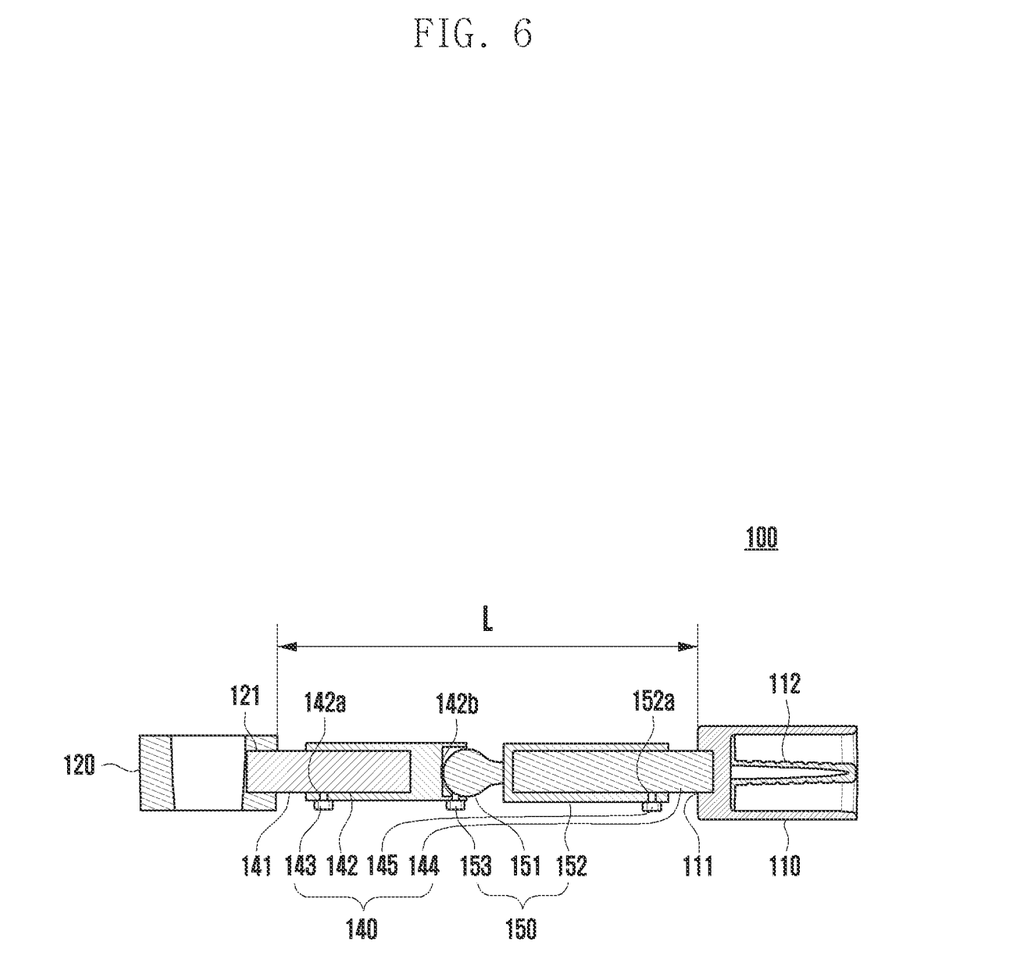
FIG. 6 is a cross-sectional view showing the structure of the setting connector according to the second embodiment of the disclosure.
Figure 7:
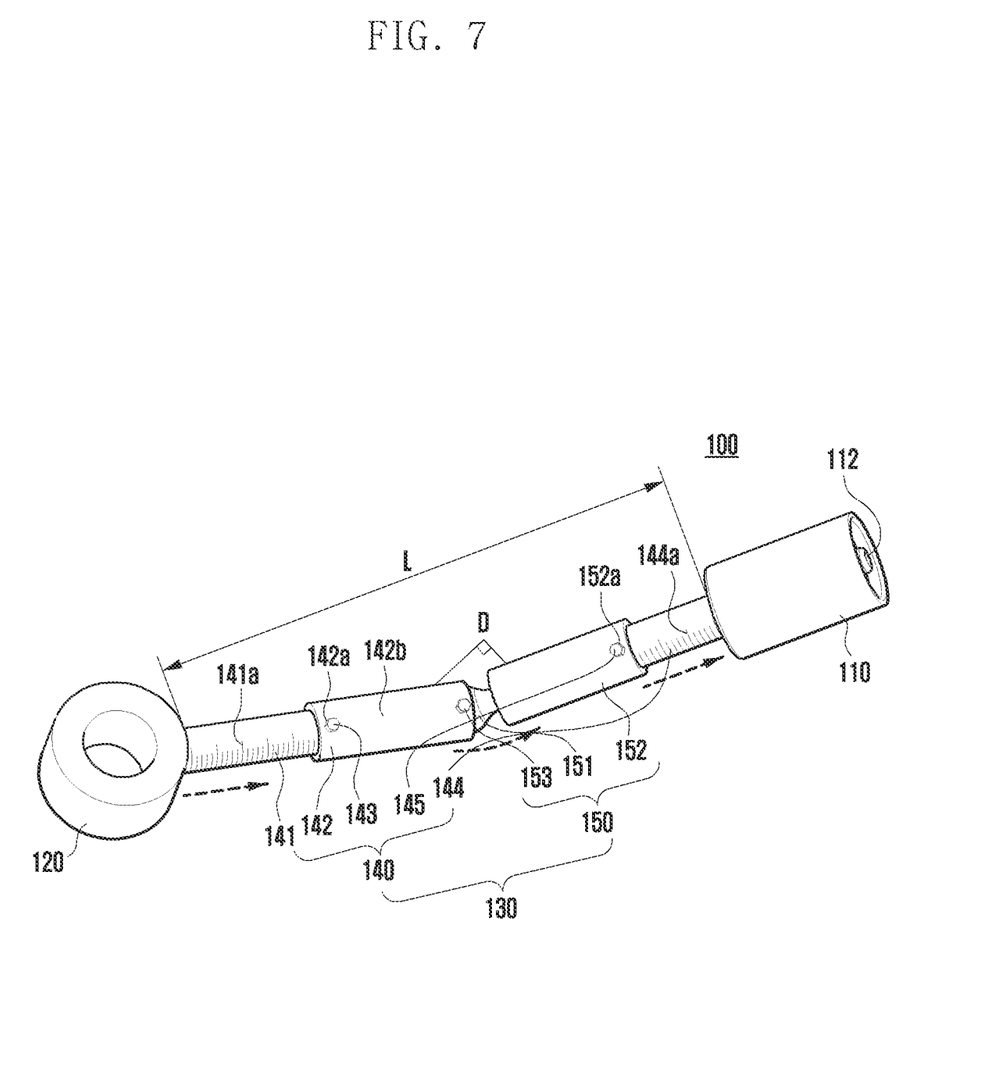
FIG. 7 is a perspective view showing an operating state of the setting connector according to the second embodiment of the disclosure.
Figure 8:
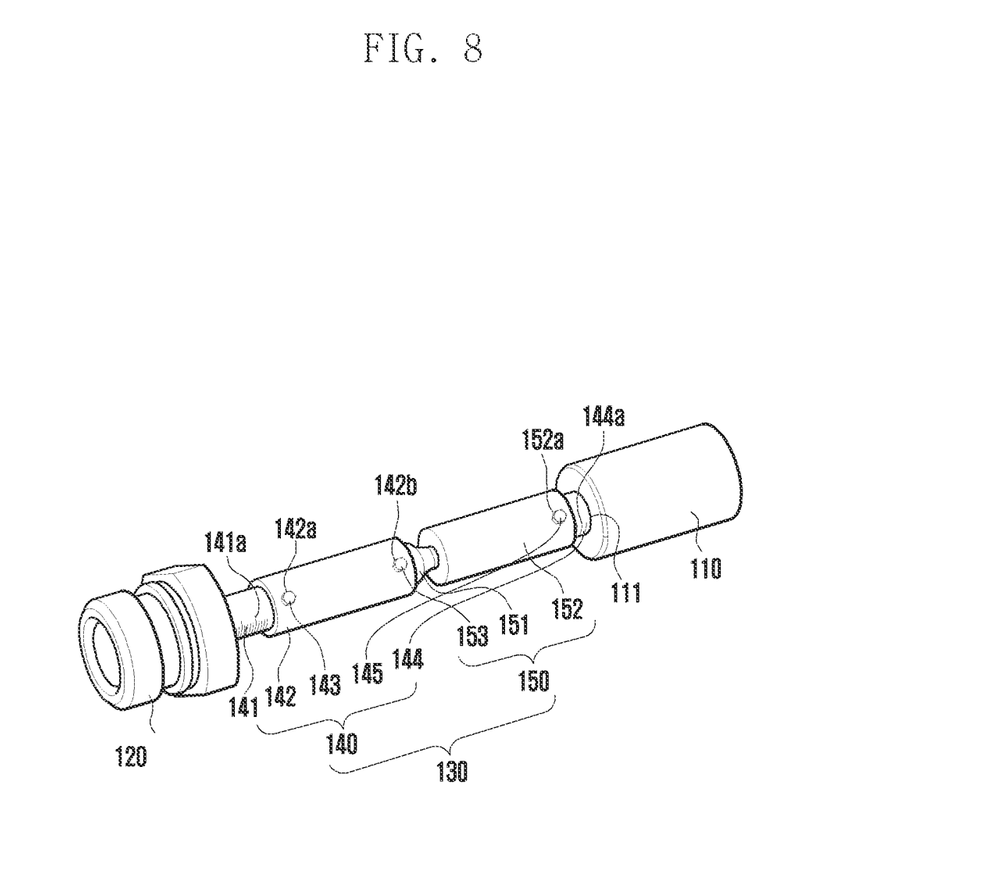
FIG. 8 is a perspective view showing another example of a second coupling portion of the setting connector according to the second embodiment of the disclosure.

FIG. 5 is a perspective view showing a structure of a connector for setting according to a second embodiment of the disclosure, and FIG. 6 is a cross-sectional view showing the structure of the setting connector according to the second embodiment of the disclosure. FIG. 7 is a perspective view showing an operating state of the setting connector according to the second embodiment of the disclosure, and FIG. 8 is a perspective view showing another example of a second coupling portion of the setting connector according to the second embodiment of the disclosure.

Referring to FIGS. 5 to 7, the connector 100 for setting the layout of the brake hose H according to the second embodiment has almost the same configuration as the above-described layout setting connector according to the first embodiment. However, the layout setting connector 100 according to the second embodiment is characterized in that the length adjuster 140 further includes a second length adjusting bar 144 which is slidably coupled to the other end of the second tube body 152 to which the ball joint 151 is rotatably coupled.

Meanwhile, in the above-described first embodiment, one end of the second tube body 152 is rotatably connected to the first coupling member 110, but in the second embodiment, one end of the second length adjusting bar 144 is rotatably connected to the first coupling member 110.

According to the second embodiment, because the length adjuster 140 further includes the second length adjusting bar 144, the length adjustment is possible at both sides based on the ball joint 151.

Specifically, in order to adjust a length between the first coupling member 110 and the second coupling member 120, that is, adjust the shortest length L between the bottom surface of the first coupling member 110 and the outer circumferential surface of the second coupling member 120, it is possible to not only slidingly move the first tube body 142 with respect to the first length adjusting bar 141, but also slidingly move the second length adjusting bar 144 with respect to the second tube body 152.

Also, in order to fix the adjusted overall length of the second tube body 152 and the second length adjusting bar 144 in the test for setting the layout of the brake hose H, the length adjuster 140 may further include a third fixing member 145 that passes through a surface of the second tube body 152 and fastens the second length adjusting bar 144 residing inside the second tube body 152. In this case, a third fastening hole 152a into which the third fixing member 145 is inserted may be formed in the surface of the second tube body 144.

In the second embodiment, the length adjuster 140 may further include a second scale indication 144a formed on the outer circumferential surface of the second length adjusting bar 144 in a longitudinal direction of the second length adjusting bar 144. The second scale indication 144a allows identifying a moving distance of the second length adjusting bar 144 with respect to the second tube body 152.

That is, the first scale indication 141a clearly indicates the moving distance of the first tube body 142 with respect to the first length adjusting bar 141, and the second scale indication 144a clearly indicates the moving distance of the second length adjusting bar 144 with respect to the second tube body 152. Therefore, the operator can easily identify how long the shortest length between the bottom surface of the first coupling member 110 and the outer circumferential surface of the second coupling member 120 is adjusted by the length adjuster 140.

Meanwhile, although in the first and second embodiments of the disclosure, the second coupling member 120 is implemented in a suitable shape for being fixed to the caliper housing 10, the second coupling member 120 may be implemented in a suitable shape for being coupled to the frame of the master cylinder. That is, as shown in FIG. 8, the second coupling member 120 may be implemented in the same shape as that of a second coupling member of the first connector 30 shown in FIG. 1, and the second coupling member 120 having this shape may be fixed to the frame through the bracket 20 shown in FIG. 1.

Figure 9:
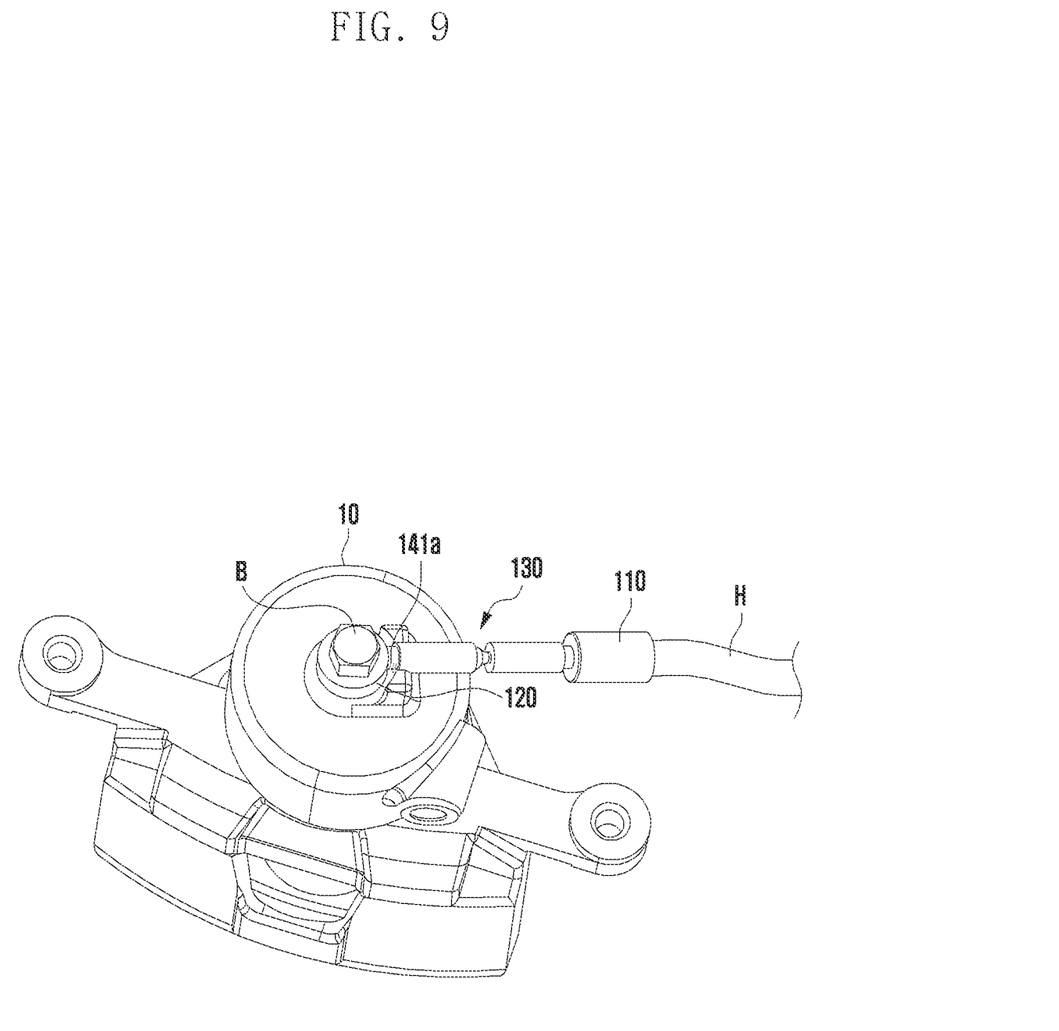
FIGS. 9 and 10 are views showing operations of the setting connector according to the second embodiment of the disclosure.

Hereinafter, operations of the connector for setting the layout of the brake hose according to the second embodiment of the disclosure will be described with reference to FIGS. 9 and 10. FIG. 9 shows a state in which the setting connector coupled at one end thereof to the brake hose is combined at the other end thereof with the caliper housing, and FIG. 10 shows a state in which the length and bend angle of the setting connector are adjusted.

As shown in FIG. 9, in order to set the layout of the brake hose H, one end of the brake hose H is coupled to the first coupling member 110 of the setting connector 100, and also the second coupling member 120 of the setting connector 100 is coupled to the caliper housing 10. Also, the other end of the brake hose H is connected to the master cylinder (not shown) through another connector (not shown).

Figure 10:
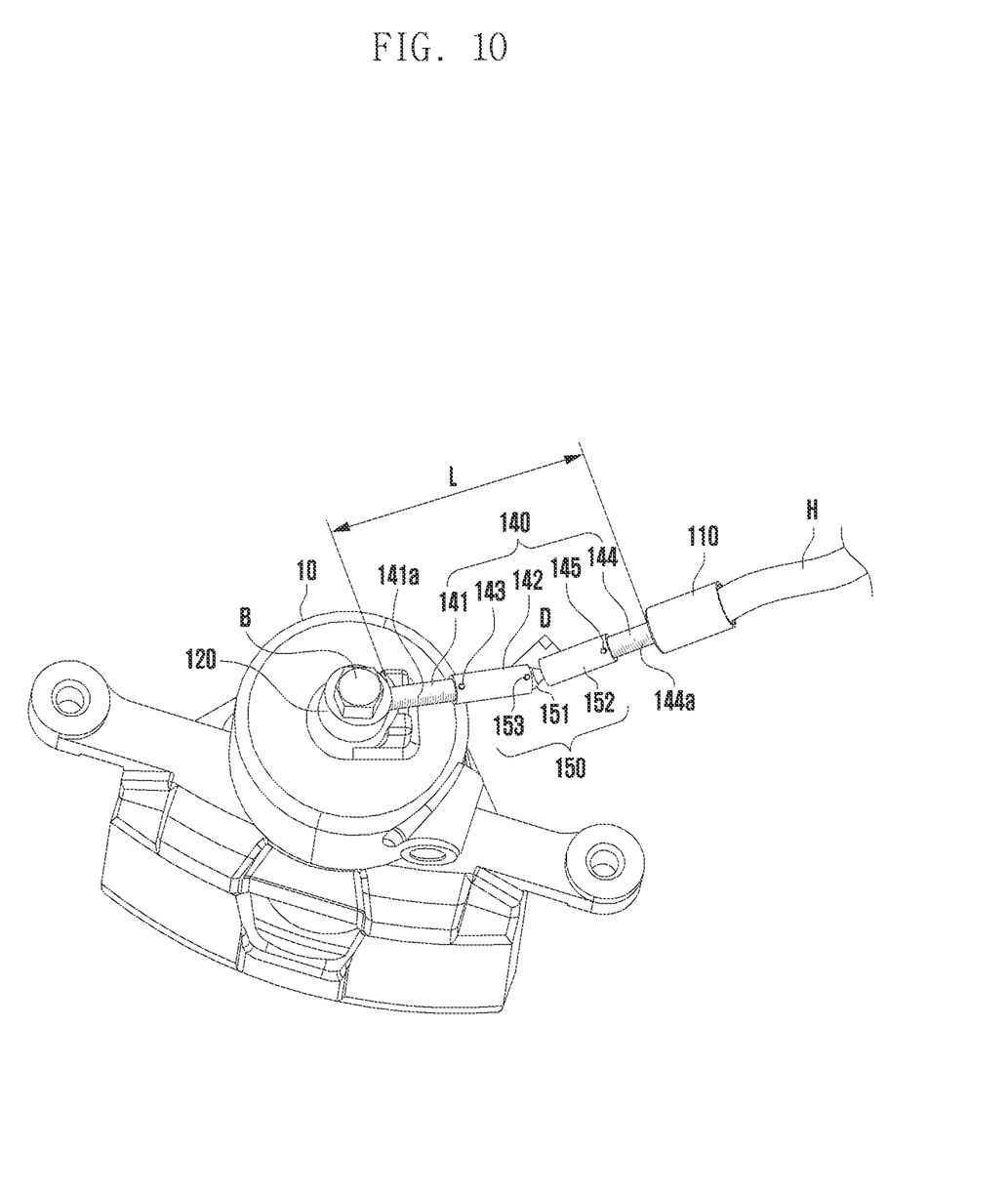

Next, as shown in FIG. 10, the shortest length (L) between the bottom surface of the first coupling member 110 and the outer peripheral surface of the second coupling member 120 is adjusted by slidingly moving the first tube body 142 with respect to the first length adjusting bar 141 and also slidingly moving the second length adjusting bar 144 with respect to the second tube body 152. After the shortest length (L) is adjusted, the first fixing member 143 and the second fixing member 145 are tightened so as to fix the adjusted length between the first and second coupling members 110 and 120.

In addition, the bend angle D between the first coupling member 110 and the second coupling member 120 is adjusted by rotating the ball joint 151 through the second tube body 152 with respect to the first tube body 142. Thereafter, the second fixing member 153 is tightened so as to fix the adjusted angle between the first and second coupling members 110 and 120.

In this state, the operator performs the test for setting the layout of the brake hose H. That is, while moving the suspension (not shown) up and down and steering the wheel (not shown) left and right, the operator checks whether the brake hose H causes interference with surrounding parts at the adjusted length and angle of the setting connector 100.

If interference occurs between the brake hose H and any surrounding part, the operator adjusts again the length and bend angle of the setting connector 100 in the adjusting unit 130.

By repeatedly performing the above process, a desired layout in which the brake hose H does not interfere with surrounding parts is set finally.

Next, based on the length and bend angle of the setting connector 100 in the finally set layout of the brake hose H, a connector that is actually disposed in a vehicle is manufactured.

As described above, by performing the test for setting the layout of the brake hose while adjusting the length and bend angle of the setting connector through the adjusting unit of the setting connector, it is possible to accurately set the layout of the connector to be actually installed in the vehicle.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A layout setting connector for setting a layout of a brake hose disposed between a caliper housing and a frame of a master cylinder in a vehicle, the layout setting connector comprising:
    a first coupling member coupled to one end of a brake hose disposed between a caliper housing and a frame of a master cylinder in a vehicle;
    a second coupling member disposed to be spaced apart from the first coupling member, and coupled to the caliper housing or the frame of the master cylinder; and
    an adjusting unit connected at one end thereof to the first coupling member, connected at an other end thereof to the second coupling member, and configured to adjust a shortest length between a bottom surface of the first coupling member and an outer circumferential surface of the second coupling member and to adjust a bend angle between the first coupling member and the second coupling member, in a test for setting the layout of the brake hose, wherein the adjusting unit comprises:
        a length adjuster comprising:
            a length adjusting bar connected at one end thereof to the second coupling member;
            a first tube body slidably coupled to an other end of the length adjusting bar;
            a scale indication formed on an outer circumferential surface of the first length adjusting bar in a longitudinal direction of the length adjusting bar so as to allow identifying a moving distance of the first tube body with respect to the length adjusting bar; and
            a first fixing member that passes through a surface of the first tube body and fastens the length adjusting bar residing inside the first tube body in order to adjust the shortest length; and
        an angle adjuster comprising:
            a ball joint rotatably coupled to the first tube body;
            a second tube body coupled at one end thereof to the ball joint and connected at an other end thereof to the first coupling member; and
            a second fixing member that passes through a surface of the first tube body and fastens the ball joint residing inside the first tube body in order to adjust the bend angle.

2. The layout setting connector of claim 1, wherein the length adjuster further comprises a second length adjusting bar slidably coupled to the other end of the second tube body, and
wherein one end of the second length adjusting bar is rotatably connected to the first coupling member.

3. The layout setting connector of claim 2, wherein the length adjuster further comprises a scale indication formed on an outer circumferential surface of the second length adjusting bar in a longitudinal direction of the second length adjusting bar so as to allow identifying a moving distance of the second length adjusting bar with respect to the second tube body.

4. The layout setting connector of claim 1, wherein the shortest length is adjusted by slidingly moving the first tube body with respect to the length adjusting bar, and the bend angle is adjusted by rotating the ball joint through the second tube body with respect to the first tube body.

5. The layout setting connector of claim 1, wherein one end of the length adjusting bar is rotatably connected to the second coupling member, and the other end of the second tube body is rotatably connected to the first coupling member.

\* \* \* \* \*